United States Patent [19]
Milicevic

[11] 3,866,932
[45] Feb. 18, 1975

[54] SLED

[76] Inventor: Josip Milicevic, 23001 Euclid, St. Clair Shores, Mich. 48082

[22] Filed: June 22, 1973

[21] Appl. No.: 372,697

[52] U.S. Cl.............................................. 280/12 R
[51] Int. Cl............................................ B62b 13/16
[58] Field of Search ........................... 280/12 R–28; D12/6

[56] References Cited
UNITED STATES PATENTS

| 407,798 | 7/1889 | Tode | 280/12 H |
|---|---|---|---|
| 905,314 | 12/1908 | Hoard | 280/21 R |
| 1,130,786 | 3/1915 | Wirt | 280/12 R |
| 1,549,448 | 8/1925 | Cebar | 280/12 R |
| 2,152,013 | 3/1939 | Anderson | 280/15 |
| 3,672,696 | 6/1972 | Akgulian et al. | 280/15 |

FOREIGN PATENTS OR APPLICATIONS

| 943,037 | 11/1963 | Great Britain | 280/18 |

*Primary Examiner*—Trygve M. Blix
*Assistant Examiner*—Jesus D. Sotelo
*Attorney, Agent, or Firm*—Basile and Weintraub

[57] ABSTRACT

A sled adapted for gliding over snow and ice and comprising a pair of spaced parallel longitudinally extending wooden runners connected by at least three parallel transversely extending bar members which are connected to the runners to maintain the runners in a spaced parallel relationship. A seat in the form of a flat board member is disposed between the runners with the underside of the seat adjacent to the front and rear bar members being supported by the top surfaces thereof while the top surface of the mid-section of the seat is in abutting support with the bottom section of the center bar member such that the seat has front and rear sections which are, respectively, disposed in planes that intersect at an obtuse angle. The sled is preferably fabricated from wood and has an overall length of 21 inches, an overall width of 12 inches and a thickness of 3½ inches. A ring member having an outer diameter sufficient to permit grasping thereof by a hand is mounted on the foremost section of the seat midway between the runners and is utilized to facilitate steering and braking of the sled.

1 Claim, 4 Drawing Figures

PATENTED FEB 18 1975 3,866,932

SLED

BACKGROUND OF THE INVENTION

1. Field of the Invention

The present invention relates to sleds adapted for movement over snow and ice.

2. Description of the Prior Art

Sleds for use over snow and ice are well known and examples of prior art sleds are disclosed in U.S. Pat. No. 407,798, U.S. Pat. No. 502,925, U.S. Pat. No. 599,991, U.S. Pat. No. 205,162, U.S. Pat. No. 1,130,786, British Pat. No. 304,661, Swiss Pat. No. 38,882, French pat. No. 660,018 and German Pat. No. 392,395. Although these patents disclose various types of sleds adapted for use over snow and ice, none disclose the novel and simple construction of the invention as now presented.

SUMMARY OF THE INVENTION

The present invention, which will be described subsequently in greater detail, comprises a sled for use over snow and ice having a pair of parallel runners which are maintained at a spaced parallel relationship by means of three laterally extending rod members through which is extended a seat inclined upwardly from its mid-section towards the front and rear of the sled with the rear portion of the seat adapting to support a rider such that his legs extend over the front of the sled in an upraised manner.

It is therefore an object of the present invention to provide a new and improved sled for use in movement over snow and ice and one which is extremely simple in its construction and design, and thus inexpensive to manufacture.

It is also an object of the present invention to provide a new and improved sled which can be easily controlled for steering or braking the same.

Other objects, advantages and applications of the present invention will become apparent to those skilled in the art of sleds when one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, in which.

DESCRIPTION OF THE PREFERRED EMBODIMENT

Figure 1:
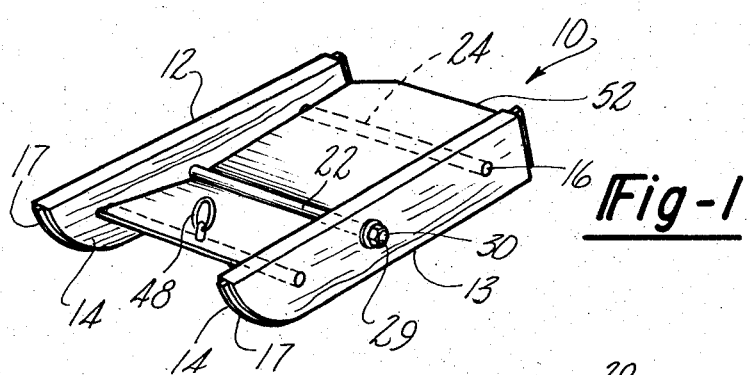
FIG. 1 is a perspective view of a sled constructed in accordance with the principles of the present invention.
Figure 2:
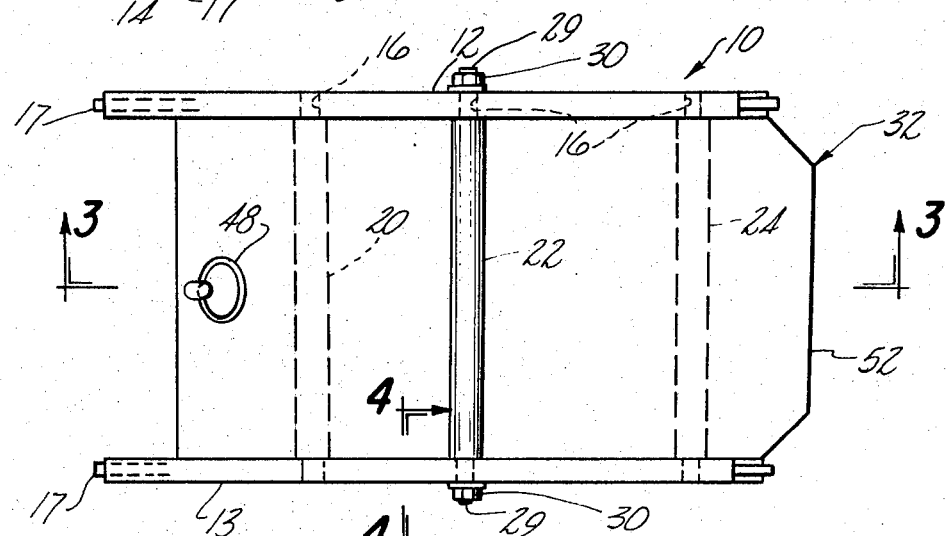
FIG. 2 is a top elevational view of the sled illustrated in FIG. 1.
Figure 3:
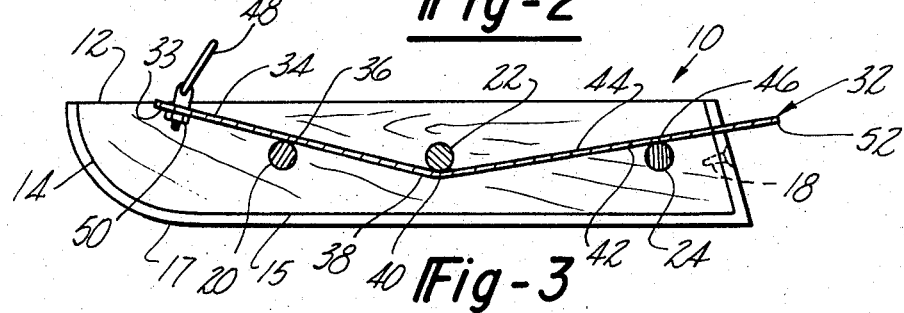
FIG. 3 is a longitudinal cross-sectional view of the sled taken along line 3—3 of FIG. 2.
Figure 4:
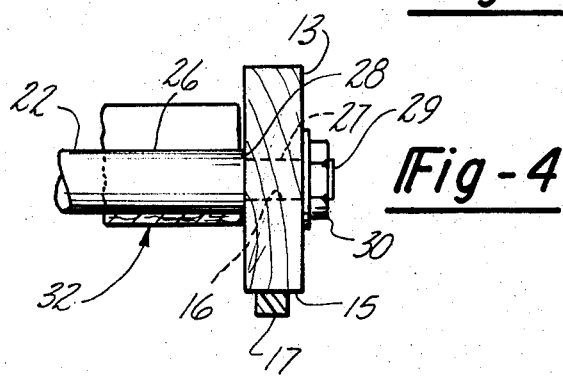
FIG. 4 is a fragmentary cross-sectional view of the sled taken along line 4—4 of FIG. 2.

Referring now to the drawing and, in particular to FIG. 1 wherein there is illustrated one example of the present invention in the form of a snow and ice sled 10. As can be seen in FIGS. 2 and 3, the snow sled 10 comprises a pair of longitudinally extending parallel runners 12 and 13. The runners 12 and 13 have arcuately shaped forward sections 14 that terminate in a longitudinal edge 15 which is adapted to ride on a snow surface. The runners 12 and 13 are each provided with three longitudinally spaced bores 16 which, as will be described hereinafter, are utilized in connecting the runners to each other to maintain the same in a spaced parallel relationship. The runners, as can best be seen in FIG. 4, are provided with metal ribs 17 that extend along the full longitudinal edge 15 of each runner and are particularly adapted for use on the sled 10 when the same is desired to be used on ice. The ribs 17, which preferably are fabricated from a metal, are utilized to provide greater traction for both speed and braking of the sled 10 when the same is used over ice. If it is anticipated that the sled will be used only on snow, the sled runners may be fabricated without the ribs 17. The ribs 17 may be attached to the runners 12 and 13 by any suitable fasteners such as screws 18 (FIG. 3).

The runners are connected by means of three parallel and laterally disposed bar members 20, 22 and 24. As can best be seen in FIG. 4, each of the bar members 20 through 24 has a enlarged cylindrical center section 26 which terminates in reduced diametered end sections 27 forming shoulders 28. The reduced sections 27 are adapted to be inserted within the aforementioned runner bores 16 with the shoulders 28 abutting the inside surface of the runners 12 and 13 to maintain the runners in the aforementioned parallel relationship. The ends 29 of the center bar member 22 are threaded and extend beyond the outer surface of the runners for a threaded engagement with nuts 30 to secure the entire sled 10 together. The remaining bar members 20 and 24 similarly could be provided with threaded sections so that the sled is secured by means of all three bar members utilizing nuts, as aforementioned. Similarly, the bar member 22 may be fabricated with smooth or non-threaded ends and the ends of each of the bar members may be fastened to the runners by means of an adhesive or the like. In the preferred embodiment, however, it is anticipated that the sled will be of sufficient strength and will perform satisfactorily if only the center bar member 22 is connected to the runners by means of the nuts 30, while the front and rear bar members 20 and 24, respectively function only as spacers. The use of only one bar member 22 having the threaded ends and engaging the nuts 30 permits the easy assembly and disassembly of the sled 10 for storage.

A seat 32 is preferably fabricated from a flat board member which is inserted between the runners and the bar members such that the lower surface 33 (FIG. 3) of the front portion 34 of the seat 32 is abuttingly supported by the upper surface 36 of the bar member 20. The midsection 38 about which seat 32 is bent to form an inclined surface, as will be described hereinafter, is in abutment with the bottom surface 40 of the bar member 22, while the bottom surface 42 of the rear section 44 of the seat 32 is abuttingly supported by the top surface 46 of the rearward most bar member 24. With the seat 32 in the position described and illustrated the front section 34 and the rear section 44 of the seat 32 are respectively disposed in planes which intersect each other at the midsection of the seat 32 at an obtuse angle.

A metal ring 48 of a size sufficient to permit the same to be grasped and held by a person is attached by any suitable fastener such as a nut and bolt arrangement 50 to the front edge of the forward section 34 of the seat 32 and midway between the runners of the sled 10. In use the rider of the sled 10 sits on the rear section 44 of the seat 32 with his feet extending outwardly across the front section 34 and raised slightly upward. His one hand grasps the ring 48 while the other hand of the rider is grasping the rear edge 52 of the seat 32.

Steering of the sled 10 is simply accomplished by properly positioning the weight of the body on the sled; for example, the driver who is sitting with his legs slightly upraised, holds the ring 48 with one hand and the other on the back edge 52 of the sled and by moving his body to the right or to the left and touching the ground with his right or left foot can cause the sled 10 to change directions to the left or the right as desired. In order to brake the sled the body weight is moved backwardly with one hand on the rear edge 52 pressing downwardly and the other hand pulling at the ring 48 to lift the front end up slightly. At the same time both legs are lowered to the ground and the sled will be easily stopped. On ice the ribs 17 along the rear edge 52 of the sled 10 will dig into the ice as the rider shifts his weight rearwardly so as to raise the front end of the sled.

Although in the preferred embodiment the sled 10 is fabricated from wood, it is to be understood that other materials such as plastic and metal may be utilized to fabricate the sled. For example, the metal ring may be fabricated from a plastic material.

It can thus be seen the present invention has provided a new and improved sled which is extremely simple in its design and construction, and thus inexpensive to manufacture. Because of its unique design the same may be disassembled and easily stored when not in use and quickly assembled for use when the same is desired.

It can also be seen that because it is extremely light weight and small, the sled may be easily transported and used by children of small size. It can also be seen that because of its small size, the sled may attain much higher speeds than more conventionally constructed sleds.

Although only one form of the present invention has been disclosed, it should be understood by those skilled in the art of sleds that other forms may be had, all coming within the spirit of the invention and scope of the appended claims.

what is claimed is as follows:

1. A sled for gliding over snow and ice, said sled comprising:
    a pair of parallel, longitudinally extended runners, each having three longitudinally spaced bores, said runners having arcuately rounded forward sections that terminate in a longitudinal edge adapted to ride on a snow surface;
    a pair of metal ribs of a width less than that of said runners and which extend along the full longitudinal edge of said runners terminating at the top rear edge of said runners, said ribs being attached to said runners by a suitable fastening means thereby providing for greater stability when said sled is used over ice;
    three parallel and laterally disposed bar members, cylindrical in shape, and which terminate in reduced diametered end sections forming shoulders adapted to be inserted into said longitudinally spaced bores in said runnerss to positively maintain said runners' parallel relationship, the center bar member being provided with threaded ends extending through said runners for a threaded engagement with nuts on the opposite sides of said runners to secure said runners to said bar members in order to provide quick assembly and disassembly of said sled;
    a seat comprising a flat board, said board having a front section and a rear section respectively disposed in planes intersecting at an obtuse angle at a central section of said seat, said seat being disposed between said runners such that the bottom sides of said front and rear sections of said seat are in an abutting supporting relationship, respectively, with the top surfaces of the foremost and rearmost of said bar members, the top side of the midsection of said seat being in an abutting support with the bottom portion of said center bar member, said seat extending beyond the ends of said runners and terminating with angled edges which form a trapezoidal protrusion which may be grasped by a human hand for facilitating manipulation of said sled to control the direction of movement of said sled; and
    a ring of a diameter sufficient to permit grasping thereof by a human hand and being affixed to said seat near the edge of said front section and midway between said runners such that said sled may be towed and controlled during use.

* * * * *